(12) United States Patent
Yokota

(10) Patent No.: US 7,166,942 B2
(45) Date of Patent: Jan. 23, 2007

(54) MAGNETO-GENERATOR

(75) Inventor: Hirohisa Yokota, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/098,424

(22) Filed: Apr. 5, 2005

(65) Prior Publication Data

US 2006/0103252 A1 May 18, 2006

(30) Foreign Application Priority Data

Nov. 12, 2004 (JP) ............................ P2004-329122

(51) Int. Cl.
 *H02K 21/12* (2006.01)
 *H02K 1/27* (2006.01)
 *H02K 9/00* (2006.01)
(52) U.S. Cl. .............. 310/54; 310/156.19; 310/156.26; 310/58; 310/60 R
(58) Field of Classification Search ........ 310/52–60 A, 310/70 R, 74, 153, 156.12, 156.21, 156.26, 310/156.19
See application file for complete search history.

(56) References Cited

U.S. PATENT DOCUMENTS

| | | | |
|---|---|---|---|
| 3,828,212 A * | 8/1974 | Harkness et al. ........... | 310/153 |
| 4,219,752 A * | 8/1980 | Katou .................... | 310/156.19 |
| 5,907,206 A * | 5/1999 | Shiga et al. ........... | 310/156.05 |
| 6,362,603 B1 * | 3/2002 | Suzuki et al. ............... | 320/163 |
| 2003/0222520 A1 * | 12/2003 | Yokota ........................ | 310/63 |

FOREIGN PATENT DOCUMENTS

| | | | |
|---|---|---|---|
| JP | 10094203 A | * | 4/1998 |
| JP | 2002-101630 A | | 4/2002 |
| JP | 2003-189511 A | | 7/2003 |

* cited by examiner

*Primary Examiner*—Darren Schuberg
*Assistant Examiner*—David W. Scheuermann
(74) *Attorney, Agent, or Firm*—Sughrue Mion, PLLC

(57) ABSTRACT

A magneto-generator includes: a plurality of magnets disposed being bonded to an inner circumferential surface of a flywheel; and a magneto coil that is disposed in the flywheel being opposed to the magnets and coaxial with the flywheel, and that generates an electric power by the action of electromagnetic induction with the magnets. The magneto coil is cooled with a cooling medium to be supplied from the opening side of the flywheel. A gap is formed in an axial direction of the flywheel between the mentioned adjacent magnets, and an annular magnet holder is bonded to an inner circumferential surface on the opening side of the flywheel and to the opening side of the flywheel of each magnet to close the opening side of the gap between the magnets. As a result, the magneto-generator is capable of suppressing the fluctuation in temperature of the magneto coil, and further reducing a coil temperature.

8 Claims, 8 Drawing Sheets

MAGNETO-GENERATOR

BACKGROUND OF THE INVENTION

1. Field of the Invention

The present invention relates to a magneto-generator that generates an electric power by the action of electromagnetic induction between a magnet and a magneto coil due to the rotation of a flywheel.

2. Description of the Related Art

FIGS. 12 and 13 show a rotor of a conventional flywheel-shaped magneto-generator disclosed in the Japanese Patent Publication (unexamined) No, 101630/2002. FIG. 12 is a cross sectional view of the magneto-generator, and FIG. 13 is a longitudinal section view taken along the line A—A of FIG. 12. In the drawings, reference numeral 1 designates a bowl-shaped flywheel formed of a circumferential wall 1c, a sidewall 1d on the side of one end of the circumferential wall 1c, and an opening 1e on the other end side. Numeral 2 designates a plurality of magnets mounted onto the circumferential wall 1c of the flywheel 1. These magnets 2 engage with protrusions 1a provided circumferentially on the inside of the circumferential wall 1c. Numeral 3 designates a tubular guard ring that is annularly mounted in close contact with the inside of the magnet 2. This guard ring 3 is formed by drawing of a metal plate, and includes a flange part 3a that is formed by bending at one end.

Numeral 4 designates a resin that fixes the magnet 2 and the guard ring 3 to the flywheel 1, thus forming an integral whole. This resin 4 is filled in between both sides of the magnet 2 and between ends of each magnet 2. Numeral 5 designates a boss part for mounting onto a rotary shaft (not shown). This rotary shaft 5 is fixed to a central portion of the sidewall 1d of the flywheel 1. Numeral 4a designates fins provided on the inside of the sidewall 1d of the flywheel 1. Numeral 1b designates a shoulder that is formed by extrusion molding on the inside of the circumferential wall 1c at several points of the entire circumference of the flywheel 1.

Describing the operations of the aforementioned conventional flywheel-shaped magneto-generator, by the rotation of the rotary shaft, the boss part 5 and the flywheel 1 that are attached to the rotary shaft rotate. Then, the fins 4a that are provided on the inside of the sidewall 1d of the flywheel 1 agitate gas in an air gap between a magneto coil and the sidewall 1d of the flywheel 1, thereby cooling the magneto coil.

In the field of a magneto-generator, it is a recent trend that further downsizing and higher power are needed. As an effective way to meet such needs, the air gap between the magneto coil and the flywheel 1 is made to be smaller so that magnetic flux from the magnet 2 is efficiently transmitted to the magneto coil.

SUMMARY OF THE INVENTION

Accordingly, it is an object of the present invention to suppress the fluctuation in magneto coil temperature, and further to reduce the coil temperature. More specifically, the invention intends to provide a magneto-generator in which a guard ring of a magnet is eliminated thereby achieving improvement in power output, and furthermore a cooling medium of a magneto coil is efficiently sprinkled over the magneto coil thereby preventing a magneto coil temperature from rising and enabling to prevent the reduction in generated current.

A magneto-generator according to the present invention includes: a bowl-shaped flywheel that is formed of a circumferential wall, a sidewall on the side of one end of the mentioned circumferential wall, and an opening on the other side of the mentioned circumferential wall, and that is fixed to a rotary shaft to rotate; a plurality of magnets that are disposed being bonded to an inner circumferential surface of the mentioned flywheel; and a magneto coil that is disposed in the mentioned flywheel being opposed to the mentioned magnets and coaxial with the mentioned flywheel, and that is caused to generate an electric power by the action of electromagnetic induction with the mentioned magnets. In this magneto-generator, the mentioned magneto coil is cooled with a cooling medium to be supplied from the opening side of the mentioned flywheel. In this magneto-generator, a gap is formed in an axial direction of the mentioned flywheel between the mentioned adjacent magnets, and an annular magnet holder is provided in such a manner as to have an annular part that is bonded to an inner circumferential surface on the opening side of the mentioned flywheel and to the opening side of the mentioned flywheel of each magnet to close the mentioned opening side of the mentioned gap between the mentioned magnets.

As a result, in the magneto-generator of above construction according to the invention, a space between the magneto coil and the sidewall of the flywheel and a gap between the adjacent magnets are both filled with a cooling medium of the magneto coil. The annular magnet holder bonds and holds the magnet, and closes the opening side of the gap between the magnets, so that a part of the above-mentioned cooling medium having been filled is dammed. Due to the fact that the flywheel rotates in the peripheral portion of the magneto coil, the cooling medium having been filled and partially dammed is efficiently sprinkled over the magneto coil. Furthermore, since the gap between the magnets possesses the effect of agitating the cooling medium, thus making it possible to efficiently cool the magneto coil.

In the magneto-generator according to the invention, the mentioned annular magneto-holder preferably includes: an annular part that is bonded to an inner circumferential surface on the opening side of the mentioned flywheel, and bonded to the opening side of the mentioned flywheel of each magnet to close the mentioned opening side of the mentioned gap between the mentioned magnets; and a columnar part that is embedded in a part of the mentioned gap between the mentioned magnets, and that is bonded to the mentioned magnets.

As a result, in the magneto-generator of above construction according to the invention, with the annular part and columnar part of the magnet holder, it is possible for the magnet to be bonded and fixed reliably and rigidly, and positioned.

The foregoing and other objects, features, aspects and advantages of the present invention will become more apparent the following detailed description of the present invention when taken in conjunction with the accompanying drawings.

DESCRIPTION OF THE PREFERRED EMBODIMENTS

Figure 7:
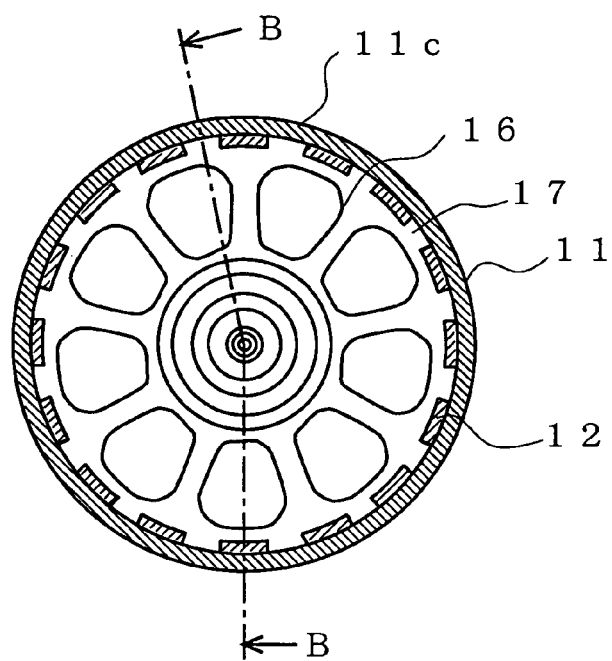
FIG. 7 is a cross sectional view of a rotor according to a prototype magneto-generator.
Figure 8:
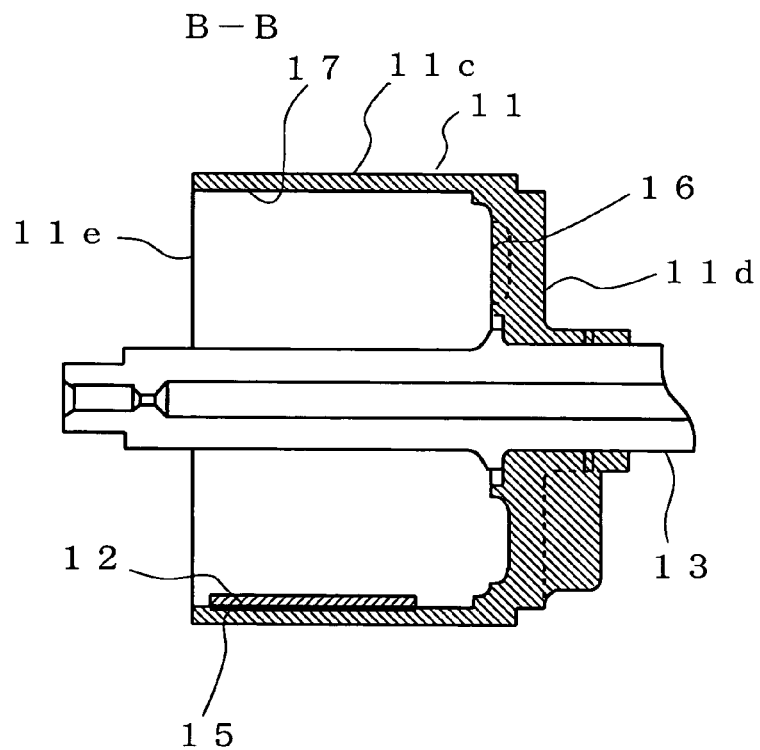
FIG. 8 is a longitudinal sectional view taken along the line B—B of FIG. 7.

FIGS. 7 and 8 show a rotor of a magneto-generator made as a prototype. FIG. 7 is a cross sectional view thereof, and FIG. 8 is a longitudinal section view taken along the line B—B of FIG. 7. Referring to the drawings, a flywheel 11 designates a bowl-shaped flywheel consisting of a circumferential wall 11c, a sidewall part 11d on one end side of the circumferential wall 11c, and an opening 11e on the other side. Numeral 12 designates a plurality of magnets that are disposed being bonded to an inner circumferential surface of the circumferential wall 11c of the flywheel 11. These magnets 12 are arranged so that be N poles and S poles are disposed alternately at even intervals. A central portion at the sidewall 11d of the flywheel 11 is mounted and fixed onto a rotary shaft 13, for example, a shaft of an internal combustion engine. The flywheel 11 rotates in synchronization with the rotation of the rotary shaft 13.

To make small a gap between a magneto coil 14 (FIG. 10) and the flywheel 11, in the structure of this prototype magneto-generator, note that there is disposed neither guard ring for the magnet 12 nor resin for making the magnet 12 integral with the flywheel 11. As a method of making the magnet 12 integral with the flywheel 11, a bonding with the use of an adhesive 15 is employed. Numeral 16 designates a fan intended to cool the magneto coil 14 and agitate oil (electrical insulating cooling medium). It is certain that higher power can be obtained with such a structure, but means for solving the problem of high temperature of the magneto coil 14 still remains. This problem of high temperature of the magneto coil 14 also induces the reduction in generated current due to rise in resistance value. Hence, a structure of high cooling effect for the magneto coil 14 is still needed.

Figure 9:
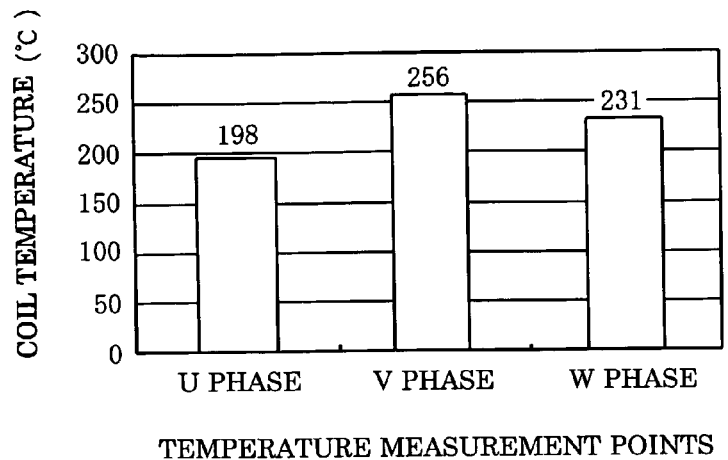
FIG. 9 is a graphic diagram indicating results of measuring a coil temperature of the prototype magneto-generator.
Figure 10:
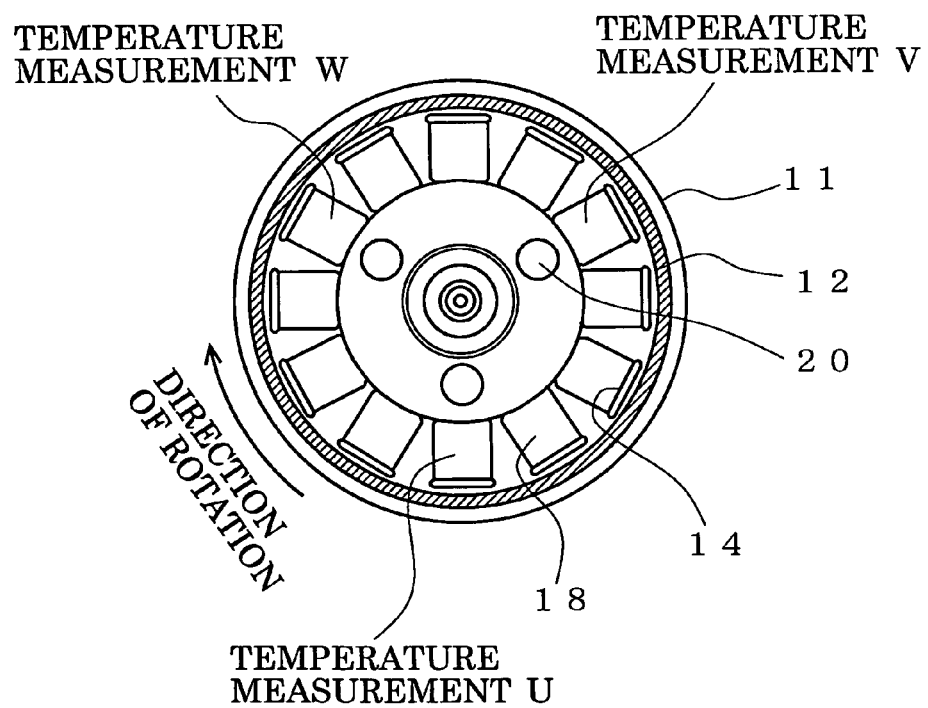
FIG. 10 is an explanatory view of a side face showing points of measuring a coil temperature of the prototype magneto-generator.

In this regard, FIG. 9 shows results of measuring a coil temperature of the aforementioned magneto-generator having been prototyped. Points of measuring a coil temperature are taken at U phase, V phase, and W phase. FIG. 10 is an explanatory view of the side face of the magneto generator. Numeral 20 designates a holding hole for fixing and holding a rotor that includes the magneto coil 14 on the side of a car body. A rotational speed of the magneto generator when measuring a coil temperature is 7000 r/min, and the cooling method of the magneto coil 14 is oil cooling (engine oil is used as a cooling medium). As a result of measuring a coil temperature of the prototype magneto-generator, U phase is 198° C., V phase is 256° C., and W phase is 231° C. Further reduction in the coil temperature as well as suppression of fluctuation in coil temperatures are needed.

Figure 11:
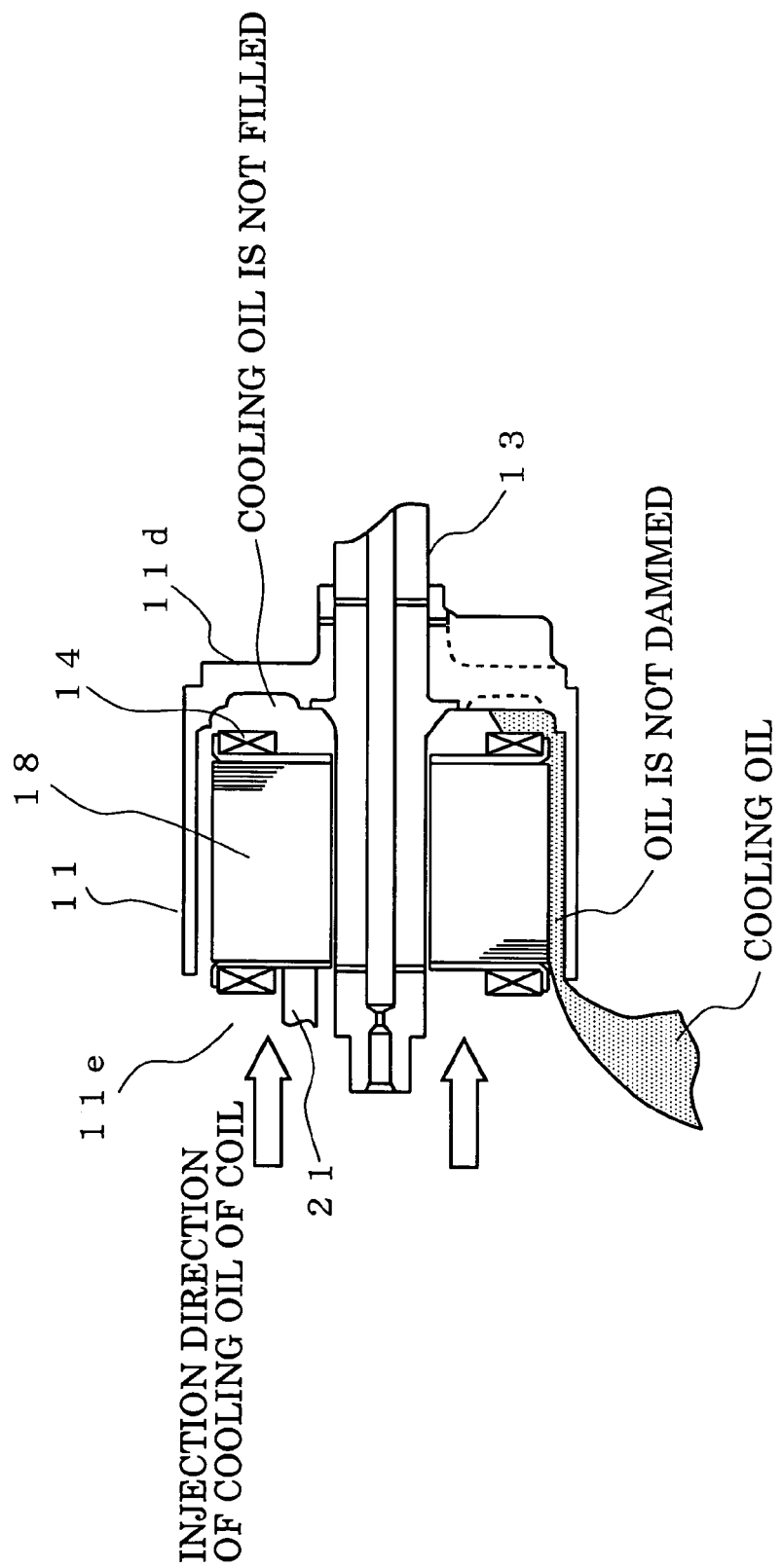
FIG. 11 is a cross sectional explanatory view of showing oil cooling with a magneto coil of the prototype magneto-generator.
Figure 12:
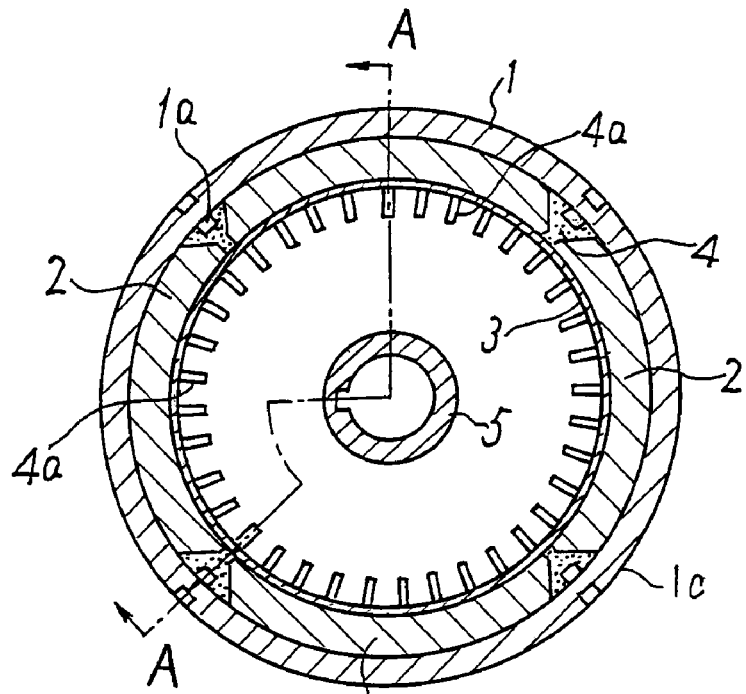
FIG. 12 is a cross sectional view of a rotor of the conventional flywheel-type magneto-generator.
Figure 13:
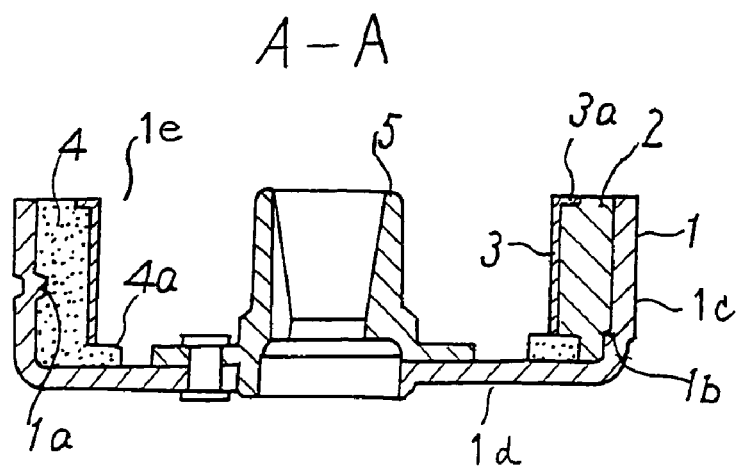
FIG. 13 is a longitudinal section view taken along the line A—A of FIG. 12.

It is presumed that the presence of a gap 17 between the magnets 12 that are fixed by bonding to an inner circumferential surface of the flywheel 11 (refer to FIG. 7) is a cause of the mentioned fluctuation in the coil temperatures. This problem of fluctuation in temperature is caused by such a construction of the prototype magneto-generator that the magnet 12 is fixed to the flywheel 11 by bonding. FIG. 11 is a cross sectional explanatory view showing oil cooling of the magneto coil 14 of the prototype magneto-generator. For example, engine oil is injected from the side of the opening 11e of the flywheel 11. The engine oil having been injected flows from, e.g., the gap between the magnetic poles 18 and reaches the side of the sidewall 11d of the flywheel 11. In addition, numeral 21 designates a holding shaft acting to fix and hold a rotor including the magneto coil 14 onto the car body side, and one of these three holding shafts is shown in FIG. 11.

By the rotation of the flywheel 11, the cooling oil is agitated with the fan 16 and sprinkled over each phase of the magneto coil 14 to absorb heat. However, since there is a gap 17 between the magnets 12, the cooling oil will soon flow out. Therefore, the flywheel 11 is not sufficiently filled with the necessary amount of cooling oil, thus being incapable of efficiently cooling the magneto coil 14. Consequently, a coil temperature is low at U phase where oil is likely to be retained, while a coil temperature at V phase and W phase where oil is unlikely to be sprinkled tends to be higher.

Hence, the invention intends to suppress the fluctuation in temperature of a magneto coil and, further, to reduce a coil temperature.

Embodiment 1.

Figure 1:
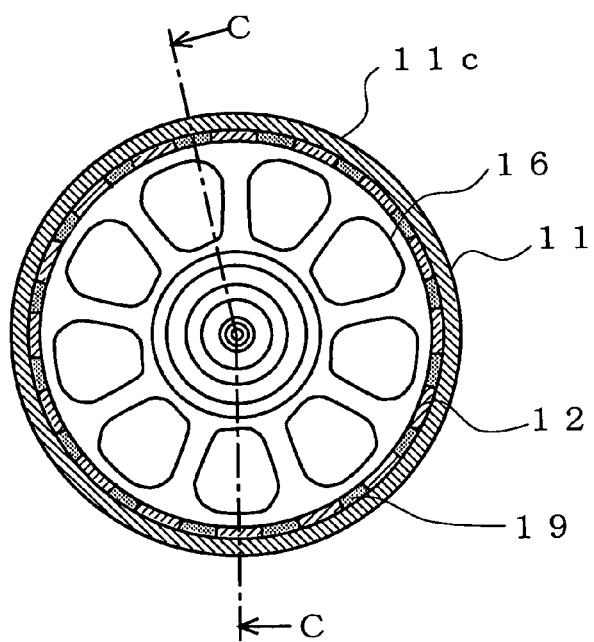
FIG. 1 is a cross sectional view of a rotor according to a first preferred embodiment of the present invention.
Figure 2:
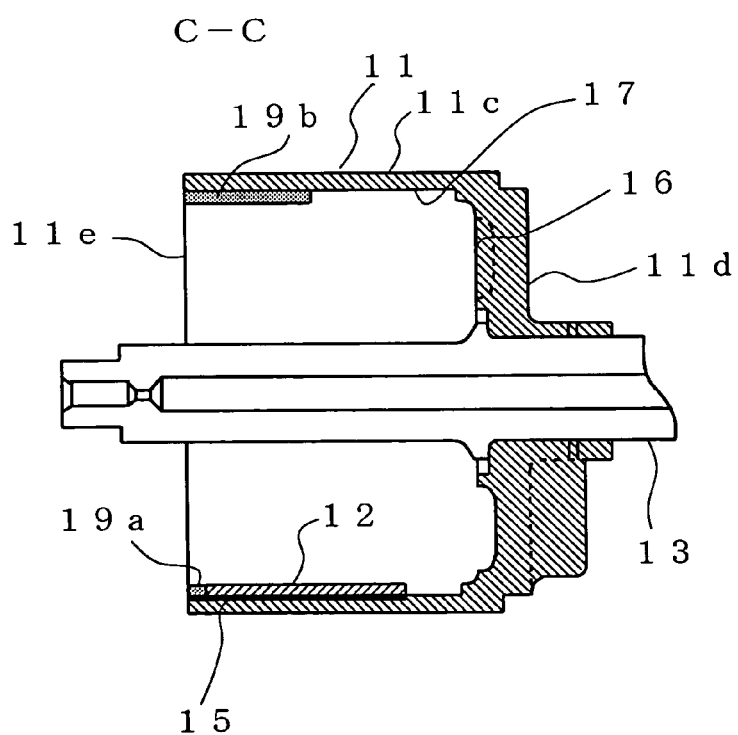
FIG. 2 is a longitudinal sectional view taken along the line C—C of FIG. 1
Figure 3:
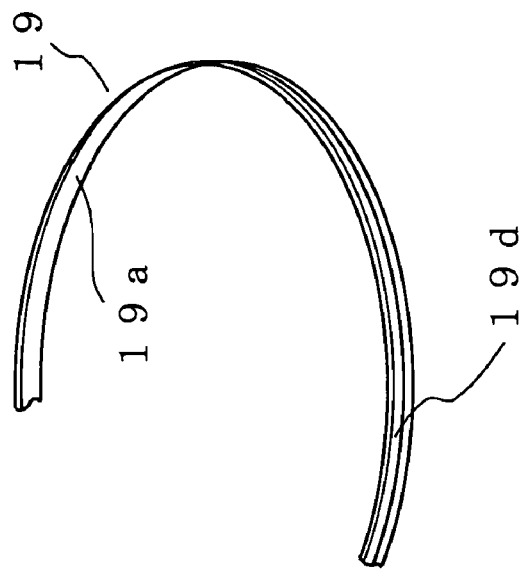
FIGS. 3(a) and (b) are perspective views each showing a part of an annular magnet holder according to the first embodiment.
Figure 3:
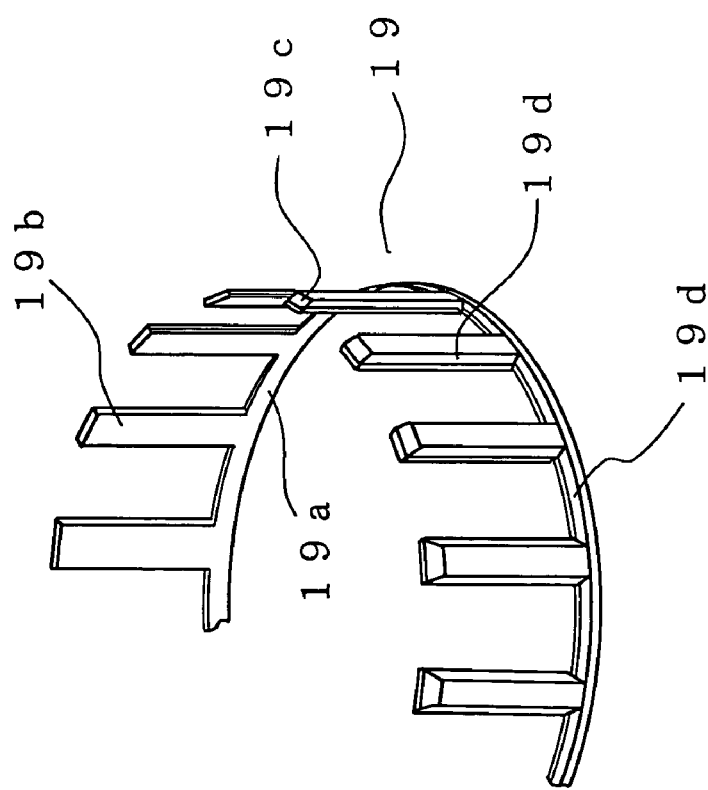
Figure 4:
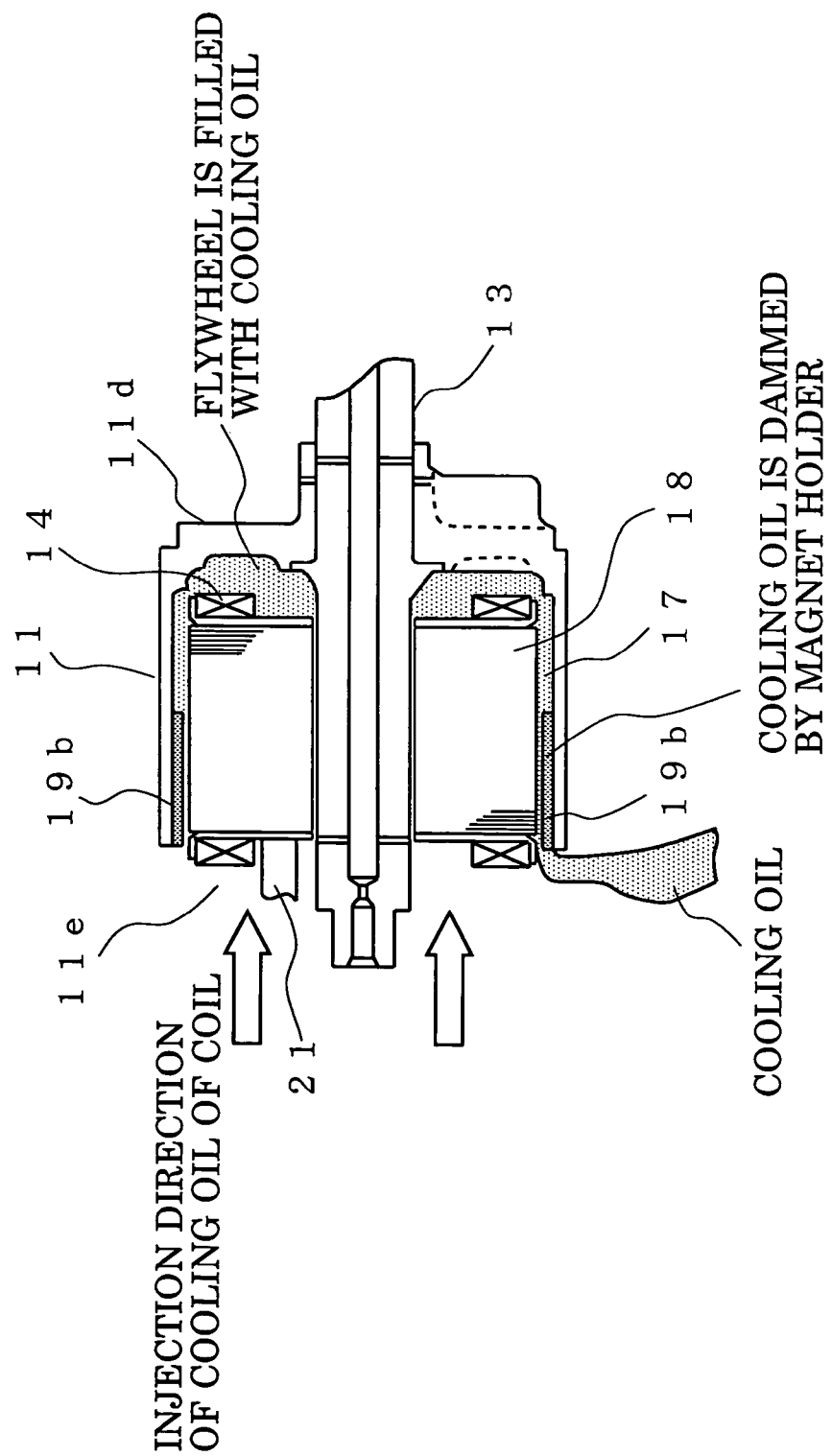
FIG. 4 is a cross sectional explanatory view of the magneto-generator showing the cooling with cooling oil according to the first embodiment.
Figure 5:
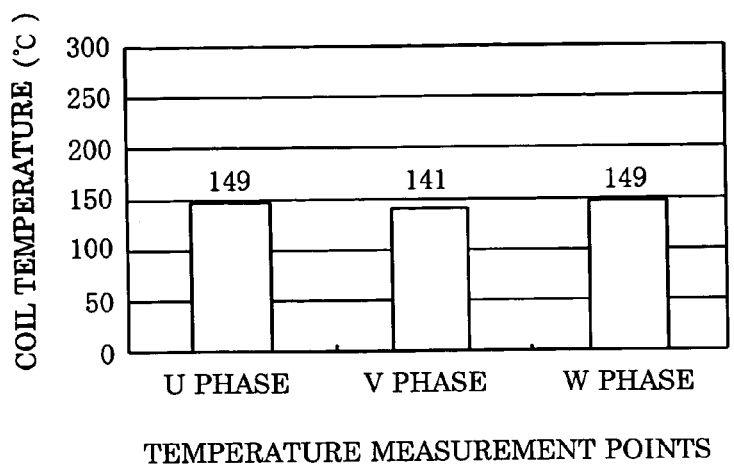
FIG. 5 is a graphic diagram indicating results of measuring a coil temperature of the magneto-generator according to the first embodiment.
Figure 6:
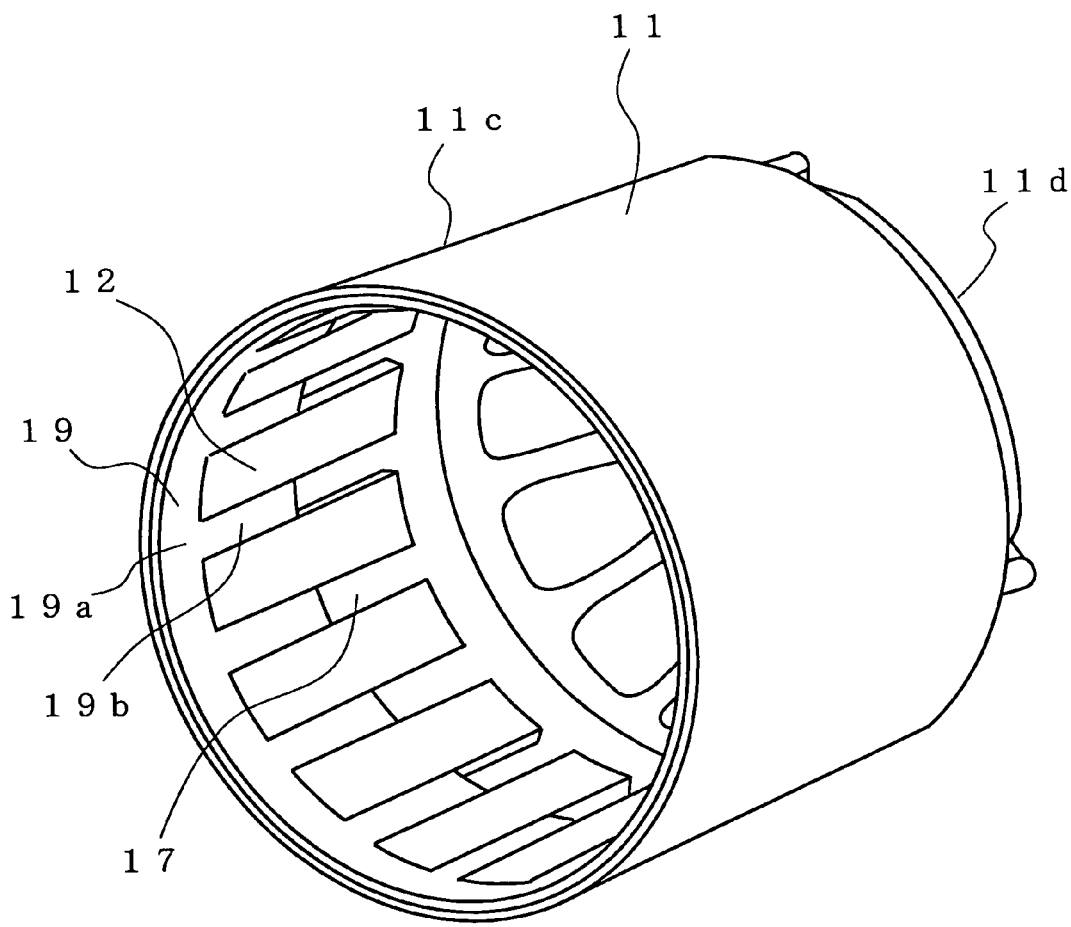
FIG. 6 is a perspective view of a flywheel sowing a state of the magnet holder being mounted according to the first embodiment.

A magneto-generator according to a first preferred embodiment of the present invention is described with reference to FIGS. 1 to 6. FIGS. 1 and 2 show a rotor of the magneto-generator according to the first embodiment, and in which FIG. 1 is a cross sectional view thereof and FIG. 2 is a longitudinal section view taken along the line C—C of FIG. 1. FIGS. 3(a) and (b) are perspective views showing a part of an annular magnet holder, and FIG. 4 is a cross sectional explanatory view of the magneto-generator showing the cooling with cooling oil. FIG. 5 is a graphic diagram indicating results of measuring a coil temperature of the magneto-generator, and FIG. 6 is a perspective view of a flywheel showing a state of the magnet holder being mounted. In the drawings, same reference numerals indicate the same or like parts, and repetition of a part or the whole of descriptions may be omitted.

As compared with the prototype magneto-generator shown in FIGS. 7 and 8, the magneto-generator according to the first embodiment is provided with an annular magnet holder 19 for the purpose of closing the opening 11e of the flywheel 11 of the axial gap 17 between the adjacent magnets 12, as well as bonding and fixing each magnet 12. The magnet holder 19 is made, for example, of a heat-resistant resin of non-magnetic substance. The annular non-magnetic magnet holder 19 is bonded to an inner circumferential surface on the opening 11e side of the flywheel 11, and is disposed in the opening 11e side of the gap 17 between the adjacent magnets 12 in such a manner as being bonded to each magnet 12. An adhesive is used for the purpose of bonding between each magnet 12 and the magnet holder 19 and bonding of each magnet 12 and the magnet holder 19 to an inner circumferential surface of the flywheel 11.

Although the annular magnet holder 19 can be formed solely of an annular part 19a shown in FIG. 3(b), it is preferred to employ the one that is provided with columnar parts 19b extending from the above-mentioned annular part 19a and being embedded in a part of each gap 17 between the adjacent magnets 12 as shown in FIG. 3(b). The columnar part 19b of the magnet holder 19 is embedded in a part of each gap 17 between the adjacent magnets 12 as shown in FIGS. 1, 2 and 4.

The columnar part 19b of the magnet holder 19 possesses preferably 40% to 60% as long as a shaft length of the magnet 12 (length of the magnet 12 in an axial direction of the above-mentioned flywheel 11). FIG. 6 shows a state of the magnet holder 19 being mounted. Since the columnar part 19b having 40% to 60% as long as a shaft length of the magnet 12 is mounted, a part of the gap 17 between the adjacent magnets can be left.

The reason why the columnar part 19b of the magnet holder 19 possesses 40% to 60% as long as a shaft length of the magnet 12 is as follows. Supposing that the columnar part 19a becomes shorter than 40% of a shaft length of the magnet 12, the magnet 12 is likely to be dislodged, resulting in lower effectiveness of preventing the magnets from falling. On the contrary, supposing that the columnar part 19b becomes longer than 60% of a shaft length of the magnet 12, an amount of coil cooling oil to be filled in the gap 17 (concave-shaped) comes to be smaller.

The flywheel 11 rotates on the peripheral portion of the stationary side magneto coil 14 in the state that the gap 17 is filled with oil acting as a cooling medium of the magneto coil 14, thereby enabling to cool the magneto coil 14 efficiently. The magnet holder 19 functions not only to fill a part of the gap 17 between the magnets 12, but also to achieve improved positioning and improved power of the magnet 12 being fixed.

In the magneto-generator according to the first embodiment, a columnar part 19b of the magnet holder 19 is disposed at a part of the gap 17 formed between the adjacent magnets 12. As shown in FIG. 4, a part of the gap 17 between the magnets 12 is filled with this columnar part 19b and, as a result, the oil acting as a cooling medium of the magneto coil 14 existing in the flywheel is less likely to leak out. Thus, the oil is dammed within the flywheel 11, and a necessary amount of oil is filled and maintained, thereby enabling to efficiently cool the magneto coil 14. It is preferable that any gas or air is employed as a cooling medium of the magneto coil 14 other than oil. In such a case, the gas or air that filled within the flywheel 11 is also agitated, making it possible to obtain a cooling effect of the magneto coil 14.

FIG. 5 shows results of measuring a coil temperature of the magneto-generator according to the first embodiment with the use of a magnet holder shown in FIG. 3(a) as the magnet holder 19. Coil temperatures are measured at each of U phase, V phase, and W phase of the coil. Points of measuring a coil temperature are the same as those shown in FIG. 10. A rotational speed of the magneto-generator when measuring a coil temperature is 7000 r/min. U phase is 149° C., V phase is 141° C., and W phase is 149° C. As compared with results of measuring a coil temperature of the prototype magneto-generator shown in FIG. 9, the coil temperatures are enormously lowered and the fluctuation in coil temperature come to be smaller.

It is understood from the above-mentioned results of measuring a coil temperature that, as a result of embedding the annular magnet holder 19 in a part of the gap 17 between the adjacent magnets 12, it is possible to fill sufficiently the flywheel 11 of the magneto coil 14 with the cooling oil. Consequently, the smaller fluctuation in coil temperature is achieved, thus enabling to considerably reduce a coil temperature.

Embodiment 2.

As described above and shown in FIG. 3(a), the magnet holder 19 is provided at equal intervals with the annular part 19a and the columnar parts 19b extending from the annular part 19a and located in the flywheel 11 in order to partially fill the gap 17 between the magnets 12. The number of columnar parts is n in the same manner as the number of magnets is n. The annular part 19a is located on an inner circumferential surface on the opening 11e side of the flywheel 11. To make it smooth to insert the magnet holder 19 into the flywheel 11, a chamfer part 19c is formed at the tip end of the columnar part 19b.

In the magneto-generator, in addition to the gap (concave-shaped) between the adjacent magnets 12, the sidewall 11d on the side of one end of the circumferential wall 11c is formed into a fan shape by forging. This fan 16 intends to cool the magneto coil 14 and to agitate oil. Specifically, it is possible to efficiently cool the magneto coil 14 by the effect of agitating a cooling medium with both of the fan 16 and the gap 17 (concave-shaped).

Furthermore, in the magneto-generator according to a second preferred embodiment, the magnet and the magnet holder 19 are bonded, and then they are fixed to an inner circumferential surface of the flywheel 11 with an adhesive 15 as described above. At this time, a very narrow gap between the magnet 12 and the magnet holder 19 may cause the adhesive 15 to get out of the gap. However, as a result of forming a chamfer part 19d at the annular part 19a and the columnar part 19b where the magnet holder 19 and the magnet 12 are in contact, any extra adhesive 15 gets into the chamfer parts 19d and does not get out to the side of the magneto coil 14 of the fly wheel 11. It is preferable that the chamfer parts 19d of the annular part 19a and the columnar part 19b is formed on the side opposite to an inner circumference of the flywheel 11 (see FIG. 3).

This magneto-generator according to the invention is applicable to, for example, a three-phase magneto-generator to be driven by an internal combustion engine.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A magneto-generator comprising:
   a bowl-shaped flywheel that is formed of a circumferential wall, a sidewall on the side of one end of said circumferential wall, and an opening on the other side of said circumferential wall, and that is fixed to a rotary shaft to rotate;
   a plurality of magnets that are disposed being bonded to an inner circumferential surface of said flywheel; and a magneto coil that is disposed in said flywheel being opposed to said magnets and coaxial with said flywheel, and that is caused to generate an electric power by the action of electromagnetic induction with said magnets;

said magneto coil being cooled with a cooling medium to be supplied from the opening side of said flywheel;

wherein an open gap is formed in an axial direction of said flywheel between said adjacent magnets, said open gap for receiving said cooling medium; and an annular magnet holder is provided in such a manner as to have an annular part that is bonded to an inner circumferential surface on the opening side of said flywheel and to the opening side of said flywheel of each magnet to close said opening side of said open gap between said magnets.

2. The magneto-generator according to claim 1, wherein said annular magneto-holder includes:

a columnar part that is embedded in a part of said open gap between said magnets, and is bonded to said magnets.

3. The magneto-generator according to claim 2, wherein a length of said columnar part, that is embedded in a part of said open gap between said magnets, is 40% to 60% an axial length of said magnet.

4. The magneto-generator according to claim 2, wherein a chamfer part is formed at a tip end of the columnar part of said magnet holder in order to make it smooth to mount the chamfer part onto said flywheel.

5. The magneto-generator according to claim 2, wherein a chamfer part of the columnar part is formed on a contact surface where said magnet contacts with the columnar part of said magnet holder.

6. The magneto-generator according to claim 1, wherein said magnet holder is made of a heat-resistant resin of a non-magnetic substance.

7. The magneto-generator according to claim 1, wherein a cooling medium, by which said magneto coil is cooled, is an electrical insulating oil.

8. The magneto-generator according to claim 1, wherein a fan that agitates a cooling medium is formed on the sidewall of said flywheel.

* * * * *